United States Patent
Sauterleute

(10) Patent No.: US 6,519,969 B2
(45) Date of Patent: Feb. 18, 2003

(54) AIR-CONDITIONING SYSTEM FOR AIRPLANE CABIN

(75) Inventor: Alfred Sauterleute, Heimenkirch (DE)

(73) Assignee: Liebherr-Aerospace Lindenberg GmbH, Lindenberg (DE)

(*) Notice: Subject to any disclaimer, the term of this patent is extended or adjusted under 35 U.S.C. 154(b) by 0 days.

(21) Appl. No.: 09/748,282

(22) Filed: Dec. 27, 2000

(65) Prior Publication Data
US 2001/0004837 A1 Jun. 28, 2001

(30) Foreign Application Priority Data
Dec. 27, 1999 (DE) ................................ 199 63 280

(51) Int. Cl.$^7$ .............................................. F25D 9/00
(52) U.S. Cl. ........................................ 62/401; 62/402
(58) Field of Search ................... 62/401, 402, 86, 62/87

(56) References Cited

U.S. PATENT DOCUMENTS

| | | | |
|---|---|---|---|
| 4,021,215 A | * 5/1977 | Rosenbush et al. | 62/402 |
| 5,086,622 A | 2/1992 | Warner | 62/88 |
| 5,299,763 A | * 4/1994 | Bescoby et al. | 244/118.5 |
| 5,911,388 A | * 6/1999 | Severson et al. | 244/118.5 |
| 6,058,715 A | * 5/2000 | Strang et al. | 62/87 |
| 6,070,418 A | * 6/2000 | Crabtree et al. | 62/86 |

FOREIGN PATENT DOCUMENTS

EP  0 019 493  11/1980

* cited by examiner

Primary Examiner—William C. Doerrler
(74) Attorney, Agent, or Firm—Jacobson Holman PLLC

(57) ABSTRACT

An air-conditioning system for airplanes is proposed in which a portion of the fresh airflow to be prepared is tapped at high pressure from a power unit and another portion is sucked in from the surroundings. The energy potential of the tapped airflow is utilized to compress the ambient air. The compressed ambient air and the tapped air are mixed into a mixed airflow before the mixed airflow's pressure is expanded in one or more turbine stages (T1, T2). Water is separated from the mixed airflow between the mixing point (X) and the first turbine stage 1 (T1). In order to cool down the tapped airflow to a temperature at which water can be separated at all, the tapped airflow is guided past the entire cooler mixed airflow, preferably in two steps (REH, CON), namely once before the pressure expansion and another time after the pressure expansion of the mixed airflow in the first turbine stage (T1). In a preferred form of execution, the ambient air is compressed in two steps, in connection with which in each case a compressor wheel (C1, C2) and a turbine wheel (T2, T1) (two-step pressure expansion) are mounted together on a shaft.

37 Claims, 4 Drawing Sheets

AIR-CONDITIONING SYSTEM FOR AIRPLANE CABIN

BACKGROUND OF THE INVENTION

1. Field of the Invention

The invention relates to an air-conditioning system for preparing pressurized air for the air-conditioning of a space, in particular for the air-conditioning of airplane cabins, and a corresponding process.

2. Prior Art

The fresh air for the air-conditioning of airplane cabins is usually prepared from the air tapped under high pressure and at high temperature from the power unit, referred to as bleed. The air-conditioning systems draw the cooling capacity required for the preparation from the pressure and temperature potential of the precompressed power unit air. The bleed is cooled off during the course of the fresh air preparation process and its pressure drops to the cabin pressure of 1 bar in ground operation or roughly 0.8 bar in flight. During the process of fresh air preparation the air is also dehumidified in order to prevent an icing of individual components of the air-conditioning system and ice crystal formation in the fresh air to be prepared. Dehumidification is necessary primarily in ground operation, however, because in flight, i.e., at high altitudes, the ambient air and thus the tapped power unit air is extremely dry anyway.

With the help of FIG. 4, an air-conditioning system is described below of the kind used in today's Airbus and Boeing passenger aircraft, for example the A330/340 and Boe 757/767.

Via a flow control valve FCV, that bleed quantity is drawn from a power unit and fed to the system at 1.5 to 3.5 bar and 150° C. to 230° C. that is needed to supply the cabin with fresh air. In ground operation the bleed is drawn from an auxiliary power unit and fed to the system at roughly 3 bar. The bleed is first guided through a primary heat-exchanger PHX and cooled off to approx. 100° C.

The bleed is then further compressed in a compressor C to approx. 4.5 bar and 160° C. and cooled off again in a main heat-exchanger MHX to approx. 45° C. The high pressure of 4.5 bar is necessary to be able to achieve a high degree of dehumidification in the subsequent water separation circuit. This system is therefore also known as a "high pressure water separation circuit".

The high pressure water separation circuit comprises a condenser CON as is proposed in EP 0 019 493 A3, and a water extractor WE downstream from the condenser CON. The compressed, cooled bleed is cooled off by roughly $T=-15$ K in the condenser CON, the condensed water is then extracted in the water extractor WE, and the pressure of the air dehumidified in this way is then expanded in a turbine T to the cabin pressure of roughly 1 bar, while the temperature at the turbine output is roughly $-30°$ C. Before it is mixed as fresh air in a mixing chamber with recycled cabin air, the thus prepared bleed is guided in heat-exchanging manner through the condenser CON of the high pressure water extraction circuit in order to cool the compressed, cooled bleed to down to the temperature necessary for water extraction in the water extractor WE. In this connection, the pressure-relieved, cooled air in the turbine T heats up again by the equivalent of $\Delta T=+15$ K to roughly $-15°$ C.

The air-conditioned air is then mixed with recycled cabin air in a mixing chamber not illustrated. The temperature at the turbine output can be raised by means of a temperature control valve TCV in order to obtain an optimal mixing temperature with the recycled cabin air mixed in. For this purpose, a portion of the bleed precooled in the primary heat-exchanger PHX is diverted and guided back to the prepared airflow behind the turbine T.

In addition to the condenser CON, a reheater REH is provided upstream from the condenser CON in the high pressure water extraction circuit. The compressed, cooled bleed is first guided through the reheater REH before it enters the condenser CON, and subsequently the now dehumidified air is again guided through the reheater REH before it enters the turbine T. In this connection, the reheater REH's task is essentially to heat the dehumidified air by roughly $\Delta T=5$ K and to evaporate residual moisture from the dehumidified air with simultaneous energy regeneration, before the air enters the turbine. This is because residual moisture in the form of fine droplets can destroy the turbine wheel surfaces and the turbine nozzles, since the air in the turbine T almost reaches the speed of sound. A second function of the reheater REH consists in relieving the condenser CON in that the compressed, cooled bleed is cooled by the equivalent of $\Delta T=-5$ K before entering the condenser CON.

The energy generated in the turbine T is used to drive the compressor C on the one hand and a fan F on the other hand. All three wheels, that is, turbine/compressor/fan, are mounted on a shared shaft and form the air cycle machine, also referred to as three-wheel machine. The fan F conveys a cooling airflow diverted from the ambient airflow through a cooling shaft in which the primary heat-exchanger and the main heat-exchanger PHX, MHX are arranged. The fan F must be actively driven by the turbine T in ground operation in particular. The ram air is sufficient to drive the fan in flight; if necessary it can be controlled by an adjustable valve at the cooling shaft entrance.

The entire system is designed for ground operation at an ambient temperature of 38° C. To optimize the efficacy of the heat-exchanging process in the cooling shaft, the water gained in the high pressure water extraction circuit is fed at a temperature of approx. $T=25°$ C. and a pressure of 3.5 bar to the cooling shaft entrance for evaporation there, thereby improving the efficacy of the heat-exchanger.

In the event that the air cycle machine ACM is completely unavailable because, for example, the necessary mass pressurized airflow to fulfill the parameters required for the system to function cannot be attained, a bypass valve BPV is provided in order to circumvent the turbine T. In this case, a check valve CV opens automatically in that an overpressure triggering the check valve CV builds up before the compressor C for lack of drive by the turbine T. The compressor C is circumvented or "short-circuited" by the check valve CV opening. In this condition, the fresh air is immediately fed through the primary and main heat-exchangers PHX, MHX directly to the mixing chamber downstream from the air-conditioning system for mixing with recycled cabin air.

As mentioned in the beginning, ice formation in the prepared fresh air presents a problem. In order to avoid ice formation, an anti-icing valve AIV is provided with which a portion of the air bled from the power unit is immediately diverted and again fed to the prepared airflow behind the turbine T.

A thermodynamically improved variant of this air-conditioning system provides for the air cycle machine ACM to be expanded by a second turbine. In this way, the turbine/compressor/fan three-wheel machine becomes a turbine/turbine/compressor/fan four-wheel machine (see U.S. Pat. No. 5,086,622 to Warner). The second turbine is mounted with the other wheels on a shared shaft in order to feed the energy generated by the turbines back into the air-conditioning system, in the manner of the conventional three-wheel system. The second turbine completes the first turbine in such a way that the pressure of the air dehumidified in the high pressure water extraction circuit is dropped in two steps, in connection with which the condenser of the high pressure water extraction circuit is arranged in heat-exchanging manner with the air conduit between the two turbines.

This saves more energy than the conventional design of the air-conditioning system because the air emerging from the first turbine is comparably warm, preferably above 0° C. to avoid ice, and this air is heated in the condenser CON by $\Delta T=+15$ Kelvin, for example, to a comparably high energy level in such a way that the second turbine can utilize this high energy level to generate energy that is lost with the conventional system. This system is known in technical circles as a "condensing cycle".

The bleeding of the fresh air to be prepared directly from the power unit proves to be problematic in the above-described air-conditioning systems. This is because the power unit temperature increases as the power unit air throughput decreases, at constant output. Since the power units are already being operated at their highest admissible temperature limit, a bleeding of the air to be prepared from the power unit is obligatorily connected with a reduction of the power unit output.

It was already proposed in the past to suck the necessary fresh air for the air-conditioning of the airplane cabin through a separately driven compressor from the ambient air and to compress it. The drive capacity required for this and the accordingly necessary drive machines are enormous and extremely heavy, however, and this is not compatible with the demands made on an airplane.

It has also been proposed in this connection to suck a portion of the necessary fresh air from the surroundings by means of a compressor driven by the turbine, to compress this air and feed it to the tapped airflow so that as a mixed airflow, its pressure is then dropped in the turbine and it is thereby cooled. However, it is difficult to implement such a system in energy-saving and structurally acceptable manner, particularly in terms of a compact, simple design and with a low weight.

In U.S. Pat. No. 5,299,763 to Bescoby et al, it is proposed to combine the ambient airflow and the tapped airflow in the turbine. This was unable to assert itself, however. In particular, two high pressure water extraction circuits must be produced with corresponding weight disadvantages and complex design. The turbine used for it is also extremely complex because it is divided into two and it is not optimal in terms of efficiency.

The technical problem of the present invention is therefore to propose an air-conditioning system and an air-conditioning process with effective water extraction that is highly efficient, affects the power unit capacity only slightly and avoids the above-mentioned construction-related disadvantages.

This technical problem is solved by an air-conditioning system and an air-conditioning process for preparing air for the air conditioning of an enclosed space in accordance with the features indicated by the following objectives.

An object of the process of the present invention is to provide the steps of tapping of a first, pressurized partial airflow ("tapped airflow") from a power unit or auxiliary power unit, tapping and compressing of a second partial airflow ("ambient airflow") from the surroundings, combining the tapped airflow and the compressed ambient airflow to form a mixed airflow, expanding the mixed airflow and conveying the mixed airflow for the air-conditioning of the enclosed space, wherein the tapped airflow is guided in a heat-exchanging manner past the mixed airflow in order to cool the tapped airflow before combining with the ambient airflow.

Another object of the present invention is to have the tapped airflow guided past the mixed airflow before and after the pressure of the mixed airflow has been dropped, and the energy required to compress the ambient air is obtained in the expansion of the mixed airflow and is utilized regeneratively.

A further object of the present invention is to have energy extraneous to the system fed in to compress the ambient airflow and the ratio of mass tapped airflow to mass ambient airflow range between 100:0 and 50:50.

A still further object of the present invention is to have the ratio of mass tapped airflow to mass ambient airflow be 65:35, and the water separated from the mixed airflow before the step of the mixed airflow.

Another object of the present invention is to have water separated from the tapped airflow and/or the compressed ambient airflow before the step of combining them, and to have the ambient airflow compressed to a pressure in the 0.8 bar to 4 bar range during the step of compressing.

It is still another object of the invention to have the tapped airflow made available at an input pressure ranging from 1.5 bar in flight to 4 bar in ground operation, and that the pressure ratios of the tapped airflow and the ambient airflow be selected in such a way that in ground operation, a pressure of roughly 3.4 bar ensues for the mixed airflow when the tapped airflow and the compressed ambient airflow are combined.

Another object of the present invention is to have the tapped airflow guided in a heat-exchanging manner past a separate cooling airflow, and in the process, undergo a relatively greater pressure change of about $\Delta p=0.05$ bar to about $\Delta p=0.3$ bar, and that the compressed ambient airflow be guided in a heat-exchanging manner past a separate cooling airflow and in the process, undergo a relatively small pressure change of roughly $\Delta p=0.01$ bar to $\Delta p =0.05$ bar.

It is a further object of the present invention to have at first the compressed ambient airflow and then the tapped airflow guided in heat-exchanging manner past the separate cooling airflow, and that water separated from the tapped airflow and/or the mixed airflow and/or the compressed ambient airflow be fed into the separate cooling airflow for evaporation.

A further object of the present invention is to have the expansion of the mixed airflow take place in two steps and between the two expanding steps the mixed airflow is guided in a heat-exchanging manner past the tapped airflow to cool the tapped airflow, and after expanding the mixed airflow, water is removed from the mixed airflow.

A further object of the present invention is that the step of compressing the ambient airflow and the step of the expanding the mixed airflow, each takes place in two steps, in connection with which, for each compression step energy is utilized regeneratively from only one of the two expanding steps in each case.

It is yet another object of the present invention to have an air-conditioning system for preparing pressurized air for the air-conditioning of a space, which system comprises at least one compressor installation (C; C1, C2) that is in contact with ambient air and compresses a partial airflow ("ambient airflow") originating from the ambient air, a mixing element ("X") in which the compressed ambient airflow is combined with a pressurized partial airflow ("tapped airflow") tapped from a power unit into a mixed airflow, and at least one expansion installation (T; T1, T2) in which pressure of the mixed airflow is dropped to a lower pressure level and the mixed airflow is cooled off in the process, characterized by at least one heat-exchanger (REH, CON) through which on the one hand the tapped airflow flows and, on the other hand, the mixed airflow flows.

Another object of the invention is that at least one heat-exchanger (REH, CON) includes a (first) heat-exchanger (CON) arranged in such a way that the mixed airflow flows through it after the expanding of the mixed airflow in the expansion installation, and that of the at least one heat-exchanger (REH, CON) includes a (second) heat-exchanger arranged in such a way that the mixed airflow flows through it before the mixed airflow is expanded in the expansion installation.

A still further object of the invention is that the expansion installation (T; T1, T2) has at least one turbine wheel and the compressor installation (C; C1, C2) has at least one compressor wheel, with both wheels on a shaft, and that a motor is provided for supplying system-extraneous energy for the compressor installation.

Another object is that the compressor installation (C; C1, C2) and the expansion installation (T; T1, T2) are designed in such a way that the ratio of conveyed mass tapped airflow to conveyed mass ambient airflow is in the 100:0 to 50:50 range, and that the ratio of mass tapped airflow to mass ambient airflow is roughly 65:35.

A still further object of the invention is that a water separator (WE2) is arranged between the mixing element ("X") and the expansion installation (T; T1), and that in a flow direction before the mixing element ("X") a water separator (WE1; WE3) is provided for separating water from the compressed ambient airflow and/or the tapped airflow.

It is another object of the invention that the system is designed in such a way that a pressure of roughly 3.4 bar ensues for the mixed airflow at the mixing element ("X"), and that the tapped airflow and the ambient airflow are guided by a first and a second heat-exchanger (PHX/MHX) past a cooling airflow, in connection with which the first heat-exchanger (MHX) serves to cool the compressed ambient airflow and is arranged in the flow direction of the cooling airflow before the second heat-exchanger (PHX) to cool the tapped airflow.

A still further object of the invention is that a water injection device provided with which water separated from the tapped airflow and/or from the mixed airflow and/or from the compressed ambient airflow is guided, before the first heat-exchanger (PHX), into the cooling airflow for evaporation there, and that the expansion installation comprises two turbine stages (T1, T2) and the (first) heat-exchanger (CON) is arranged between the two turbine stages.

It is an object of the invention that a water separator (WE4) is arranged between the two turbine stages (T1, T2), and that the compressor comprises two compressor wheels (C1, C2) on separate shafts and each compressor wheel (C1, C2) is mounted, with only one turbine wheel in each case (T2/T1), on a shared shaft.

Another object of the invention is that one of the shafts in application with the preceding object is additionally equipped with a motor (M) that can also act as a generator (G), and that in the flow direction of the ambient airflow and behind the compressor installation (C1, C2), a surge valve (CSV) is provided in order to blow off largely uncompressed ambient air sucked in.

A further object of the invention is that a bypass valve (BPV1) is provided in order, during flight, to mix the compressed ambient airflow into the tapped airflow only after its pressure has dropped, and that a bypass valve (BPV2) is provided in order, during flight, to direct the tapped airflow past the mixing element ("X") directly to the expansion installation (T; T1, T2)

For this purpose, it is provided for that only a portion of the fresh air to be prepared (bleed) is bled from the power unit under comparably high pressure. The other portion of the fresh air to be prepared is sucked from the ambient air, preferably as ram air, compressed and combined with the pressurized tapped airflow into a mixed airflow. The mixed airflow's pressure is then dropped, preferably in one or more turbine stages. The energy gained during the expansion can be utilized regeneratively to compress the ambient airflow sucked in.

To solve the aforementioned technical problem, the invention furthermore provides for the tapped airflow to be guided in heat-exchanging manner past the mixed airflow in order to cool the tapped airflow before combining with the ambient airflow. This is essential for an effective water extraction from the tapped airflow. The efficacy of the water extraction results in particular from the fact that the cooler mixed airflow guided past the tapped airflow is comparably large compared to the tapped airflow, preferably at a ratio of 100:65.

It is particularly advantageous if the tapped airflow is guided in heat-exchanging manner twice past the mixed airflow, namely once before the mixed airflow's pressure is dropped and another time after the mixed airflow's pressure has been dropped.

The water is then preferably extracted from the mixed airflow before the mixed airflow's pressure is dropped but may also or additionally be extracted already from the compressed ambient airflow or the cooled-off tapped airflow.

The air-conditioning system according to the invention with the highly effective water extraction from the tapped airflow makes it possible to use a single water extraction circuit and a conventional turbine arranged downstream from the water extraction circuit to drop the mixed airflow's pressure. The system comprises roughly the same number of components as an air-conditioning system in which the entire cooling airflow to be prepared is bled from the power unit. The particular flow guiding of the tapped airflow and of the compressed ambient airflow by means of this system produces an air-conditioning system with effective water extraction that is highly efficient, in connection with which the power unit capacity is only affected a little and the system can be designed compact, not complex and with low weight, especially since no additional components are needed.

The air-conditioning system according to the invention thus has two circuits, a first circuit for the bleed and a second circuit for the ambient air, which are combined at a mixing point at which the same pressure, that is, the mean pressure, ensues for both circuits. This design requires that a change of parameters in the one circuit automatically affects the other circuit thus resulting in an overall system that is self-adjusting.

At the mixing point a mean pressure ensues that is between the pressure of the bled power unit air and the ambient air pressure or ram pressure. The bleed is fed to the system under a pressure in the 1.5 bar range in flight and 4 bar in ground operation, preferably 2 bar and 3.5 bar, respectively. The entire system is then preferably designed in such a way that at a mass tapped airflow/compressed mass ambient airflow ratio of approx. 65:35, a mixed air pressure of approx. 3.4 bar ensues at the mixing point in ground operation.

For the purpose of cooling off and subsequent water extraction, first of all the bleed as well as the compressed ambient air are each cooled off in a heat-exchanging process, for example in crosswise counterflow, with a cooling airflow from uncompressed and thus comparably cool ambient air. The heat-exchanger for cooling off the compressed ambient airflow and the heat-exchanger for cooling off the tapped airflow are advantageously connected in series in such a way that the cooling airflow from uncompressed ambient air can flow through them one after the other. In this way, the flow channel for the cooling airflow can be kept comparably narrow and be designed compactly, having a positive effect on the weight of the entire system. The heat-exchanger for cooling off the compressed ambient air is preferably arranged before the heat-exchanger for cooling off the bleed, to be able to cool off the compressed ambient airflow—making use of the maximal temperature drop—to such a low temperature that water from the compressed ambient airflow condenses.

The efficiency of the entire system can be optimized by appropriately designing the related heat-exchanger. A high level of efficacy of the heat-exchanger for the bleed is achieved by a high degree of concentration, in connection with which a considerable pressure loss via the heat-exchanger is acceptable because the bleed is bled from the power unit under comparably high pressure anyway.

The ratio of bled mass airflow from the power unit to compressed ambient air is high, preferably around 65 to 35. Due to the comparably small mass flow of the compressed ambient air, the heat-exchanger for cooling off the compressed ambient air can be designed very efficiently with low density, with a slight pressure loss occurring via this heat-exchanger. Efficiency is particularly high especially when the entire cooling airflow is used for cooling the relatively small ambient airflow (i.e., when the heat-exchangers are connected in series in the cooling airflow channel) and when, in addition, preferably the entire cooling capacity from the evaporation of the water obtained in the high pressure water extraction circuit is made available to this heat-exchanger.

A further design of the invention provides for the expansion of the mixed air to take place in two steps, and the condenser of the high pressure water extraction circuit is arranged between the two turbines. The system's efficiency can be further improved by this measure. In this connection, water is advantageously extracted from the mixed air in an additional water extractor after the mixed air's in the first turbine stage. This additional water extraction is not only advantageous in the air-conditioning system according to the invention as described here but rather in any system with two-step pressure expansion and condenser arranged in between.

Yet another design of the invention provides for not only the mixed airflow's expansion but also the compression of the sucked-in ambient air to take place in two steps, with in each case a turbine wheel and a compressor wheel mounted on a shared shaft. Thus, altogether two shafts separate from each other and each with a turbine wheel and a compressor wheel are provided. In this way, a substantially more flexible design of the entire system and thus an even greater efficiency are achieved, particularly in flight.

In all of the aforementioned designs of the invention, a motor can advantageously also be provided on a shared shaft with the turbine wheel and the compressor wheel. This motor makes it possible to feed additional energy to the air-conditioning system at peak loads to generate an additional fresh air quantity and/or cooling capacity. In connection with the form of construction of the invention in which two shafts each with a turbine wheel and a compressor wheel are provided, this motor can also be used as a generator, particularly in flight.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The invention is described below with the help of FIGS. 1 through 4 as an example. The figures show.

DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
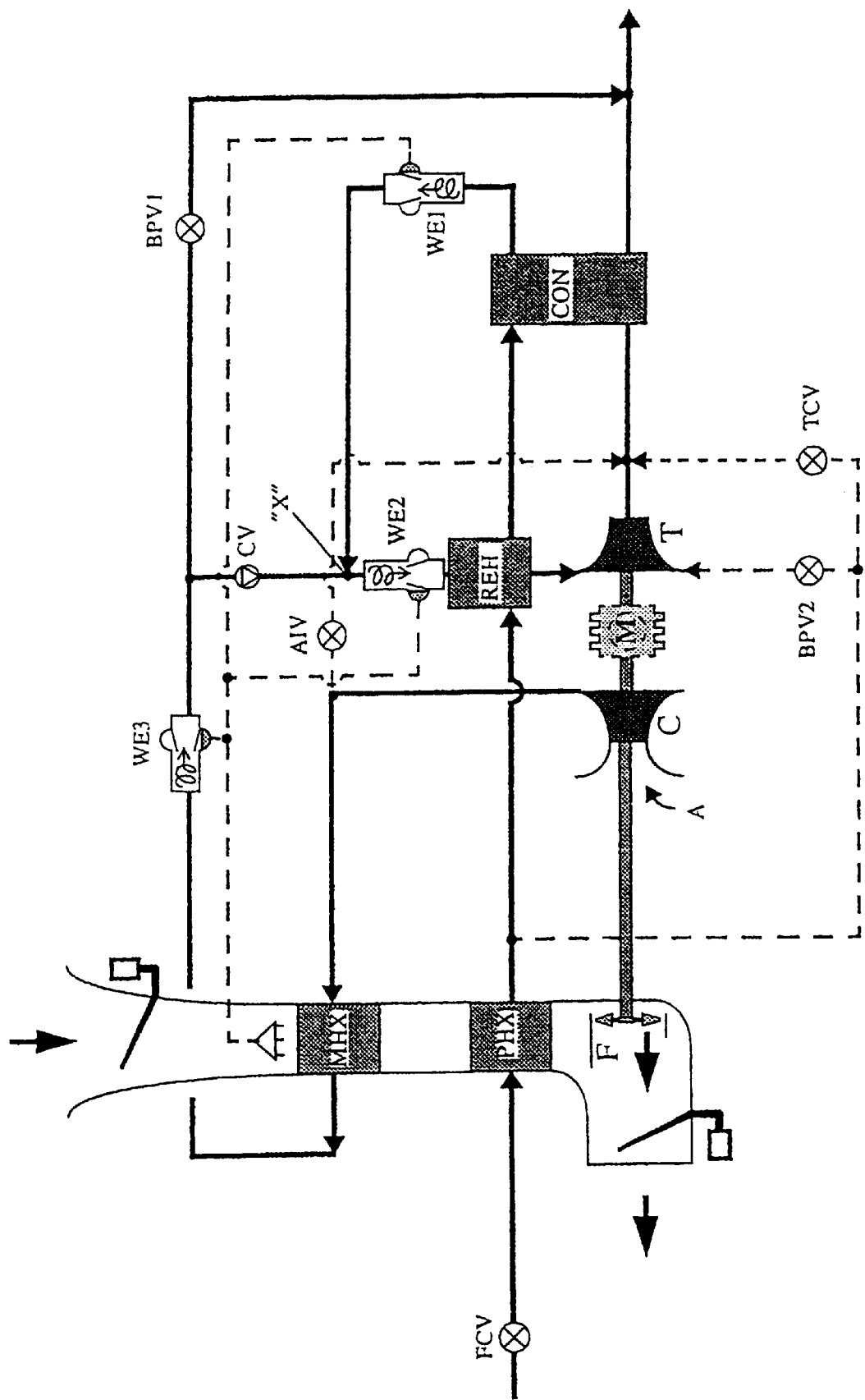
FIG. 1 a diagram concerning an air-conditioning system according to the invention.
Figure 4:
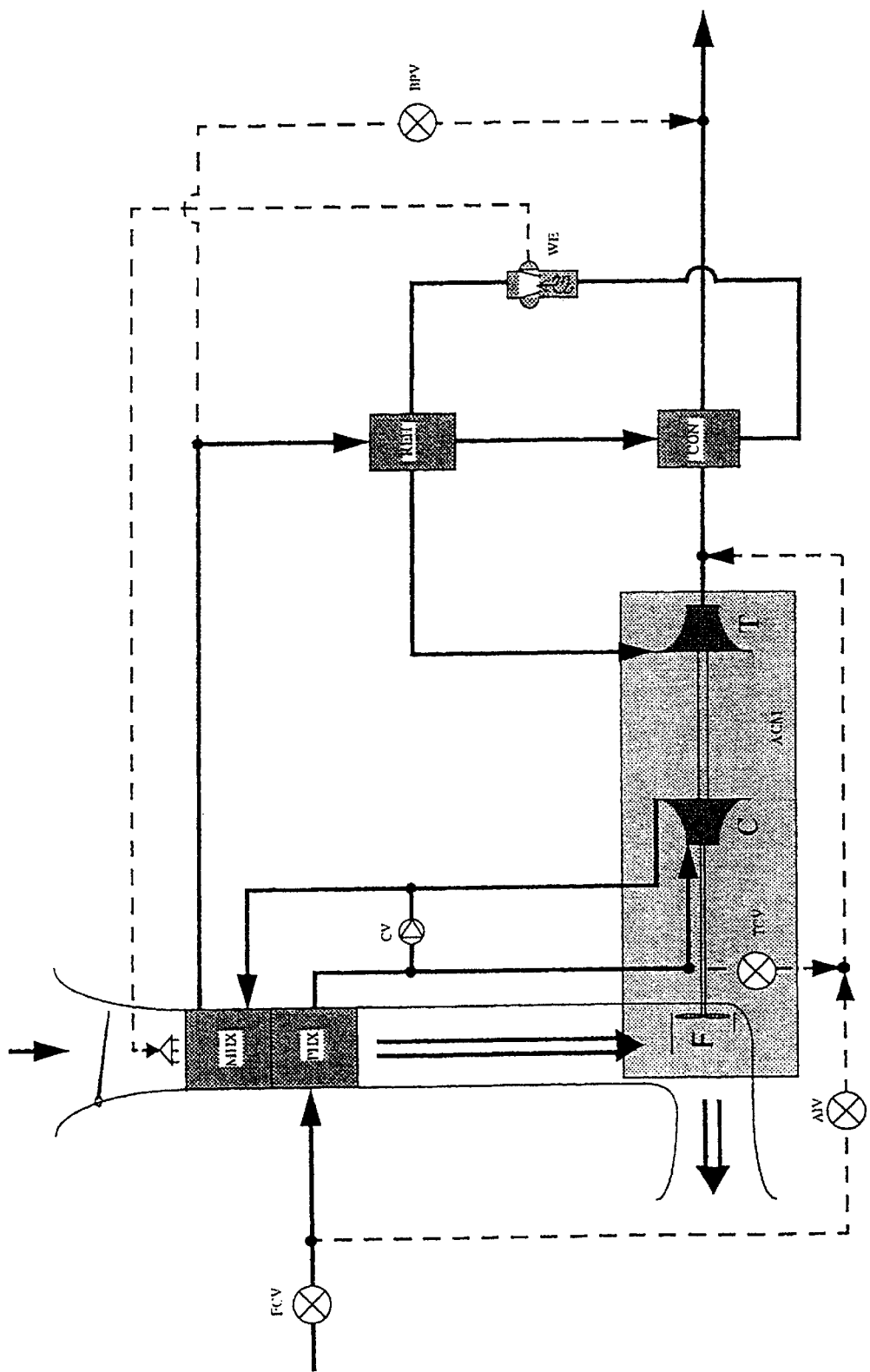
FIG. 4 an air-conditioning system according to the state of the art.

FIG. 1 shows an air-conditioning system that comprises a tapped air circuit and another circuit for air sucked from the surroundings ("ambient air circuit"). The tapped air circuit largely corresponds to the air-conditioning system described using FIG. 4 with respect to the state of the art. However, the tapped airflow is not further compressed after passing the primary heat-exchanger PHX, but rather it is conveyed immediately into the high pressure water extraction circuit. A compression of the tapped airflow is not necessary because the air is bled from the power unit under comparably high pressure anyway. Since the compression step is eliminated, the tapped airflow does not absolutely have to be guided through the second heat-exchanger MHX.

In detail, the tapped airflow circuit is structured as follows. A portion of the fresh airflow is bled under high pressure from the power unit via a flow control valve FCV and made available to the air-conditioning system at an initial pressure ranging from 1.5 bar in flight to 4 bar in ground operation, preferably 3.5 bar in ground operation. The tapped airflow is then guided through a ram air heat-exchanger or primary heat-exchanger PHX and cooled off.

The tapped airflow is then cooled off again in a high pressure water extraction circuit in order to precipitate moisture from the tapped airflow. For this purpose, the tapped airflow is first guided in a reheater REH past a cooler mixed airflow formed from the tapped airflow and the compressed ambient airflow (before the mixed airflow's expansion in a subsequent turbine). After that, the tapped airflow pre-cooled in this way is guided through a heat-exchanger acting as a condenser CON past the mixed airflow again (in connection with which the mixed airflow meanwhile already underwent a expansion in the turbine T and was accordingly cooled off considerably). The tapped airflow, which has a temperature of roughly 200° C. before entering the primary heat-exchanger PHX and a temperature of roughly 50° C. before entering the reheater REH, then makes its way to the mixing point "X" at a temperature of roughly 30° C., where it is combined with prepared ambient air. The liquid precipitated from the tapped airflow is preferably extracted in a water extractor WE2 only after the tapped airflow is mixed with the compressed ambient airflow.

The water extractor WE1 shown behind the condenser CON in FIG. 1 is optional and can be provided additionally or in place of the water extractor WE2.

After water extraction in the water extractor WE2 is completed and before expansion in the turbine T, the mixed airflow is guided in the heat-exchanger REH designed as reheater in heat-exchanging manner past the tapped airflow, whereby the mixed airflow is slightly heated. In this way, on the one hand the condenser CON is relieved in the high pressure water extraction circuit and, on the other hand, the turbine T is protected from damage by water droplets contained in the mixed airflow that evaporate when flowing through the reheater REH. After the mixed airflow's expansion and cooling in the turbine T, the mixed airflow is guided through the condenser CON in heat-exchanging manner past the tapped airflow and warmed up in the process. The mixed airflow prepared in this way is fed as a fresh airflow to a mixing chamber (not illustrated) in which the mixed airflow is mixed with recycled cabin air.

The ambient air circuit is set up as follows. An ambient airflow or ram airflow A is sucked in via a compressor C, compressed to a mix pressure ranging from 1.5 bar to 4 bar in ground operation, preferably to roughly 3.4 bar in ground operation, and to cool off, is guided through a ram air heat-exchanger MHX acting as a condenser, before it is combined at the mixing point "X" with the prepared, dehumidified tapped airflow. In addition, a check valve CV is provided shortly before the mixing point "X" in order to prevent a reflux when the pressure of the tapped air is greater than the pressure of the compressed ambient air when opening the bypass valve BPV1 particularly in flight. The water extractor WE3 illustrated in FIG. 1 in the compressed ambient airflow is only optional, like the water extractor WE1 provided for in the tapped airflow, as a supplement to the water extractor WE2. The two water extractors WE1 and WE3 combined can also fully replace the water extractor WE2, however.

The water extracted in the water extractors (WE1, WE2, WE3) is fed to the ram air heat-exchanger MHX for evaporation there and cooling particularly of the compressed ambient airflow, thereby further increasing the overall system's efficiency.

At the mixing point "X", the tapped airflow and the compressed ambient airflow have the same pressure of preferably 3.4 bar in ground operation and roughly the same temperature. The temperature of the tapped airflow is normally slightly below the temperature of the ambient airflow. The ratio of mass tapped airflow to mass ambient airflow can range from 100:0 (e.g. in flight) to 50:50 and is preferably roughly 65:35 in ground operation.

The compressor wheel C and the turbine T are mounted together with the fan F on a shared shaft. This is thus a three-wheel system, similar to the air cycle machine ACM as described in FIG. 4 relating to the state of the art. That means that the energy that is generated in the turbine T during the mixed airflow's pressure expansion is utilized to drive the compressor C and the fan F. This energy originally comes from the tapped airflow, i.e., the high energy level of the tapped airflow (m, p, and), which is essentially used to compress the ambient airflow or ram airflow A.

The previously described air-conditioning system is used in this way particularly in ground operation and at low flight altitudes, where extraction of the moisture contained in the air is important. In flight at great altitudes, on the other hand, the pressure of the ambient air or ram air A is too low to achieve at mixing point "X" a technically sensible mixing point pressure. A bypass valve line with a bypass valve BPV1 is therefore provided in the ambient air circuit via which the ambient air compressed in compressor C and cooled off in the ram air heat-exchanger MHX is guided past the turbine T and mixed into the pressure-relieved, cooled off tapped airflow only before the mixing chamber not illustrated.

In addition, an ant-icing valve AIV is provided with which compressed ambient air from the ambient air circuit is added uncooled behind the turbine to act against icing in the mixed airflow drastically cooled off by the expansion. The anti-icing valve at the same time has the function of a temperature control valve as well as a surge valve to relieve the compressor C if necessary. Additional air from the tapped airflow can be diverted also or if necessary and added to the reduced-pressure mixed airflow behind the turbine T. The temperature control valve TCV serves this purpose.

A second bypass valve BPV2 is provided in the tapped airflow in order to circumvent the high pressure water extraction circuit in flight. Since only dry air is bled from the power unit in flight at high altitudes anyway, the high pressure water extraction circuit would cause an unnecessary reduction of the overall efficiency of the air-conditioning system. The bypass valve BPV2 is preferably implemented in connection with a dual-nozzle turbine in order to reduce to a minimum the size of the ram air heat-exchanger PHX.

In the previously described air-conditioning system it is possible to design the ram air heat-exchangers MHX and PHX with high efficiency by selecting a suitable density for the heat-exchangers. A large mass airflow flows under comparably high pressure through the heat-exchanger PHX in the tapped air circuit. To produce a high degree of efficiency, the heat-exchanger PHX can thus be designed with a relatively great drop expansion for the tapped air flowing through, by equipping the heat-exchanger with a comparably high density. On the other hand, a comparably small mass airflow flows under somewhat lower pressure through the heat-exchanger MHX in the ambient air circuit.

The pressure loss via the heat-exchanger MHX should be kept to a minimum level. The pressure loss $\Delta p$ via the heat-exchanger PHX is between 0.05 bar and 0.3 bar, whereas the pressure loss via the heat-exchanger MHX is only between 0.01 bar and 0.05 bar.

As FIG. 1 shows, the heat-exchangers MHX and PHX are connected in series in a cooling airflow channel in such a way that the entire cooling airflow flows through both heat-exchangers. This offers the advantages mentioned in the beginning and allows in particular a compact, light design of the entire system.

In FIG. 1, along with the turbine T, the compressor C and the fan wheel F, a motor M on a shared shaft is also illustrated in dotted line; it can be optionally provided in the air-conditioning system in order to additionally feed energy to the air-conditioning system in the event of peak loads (increase of the fresh air quantity and/or cooling capacity).

Figure 2:
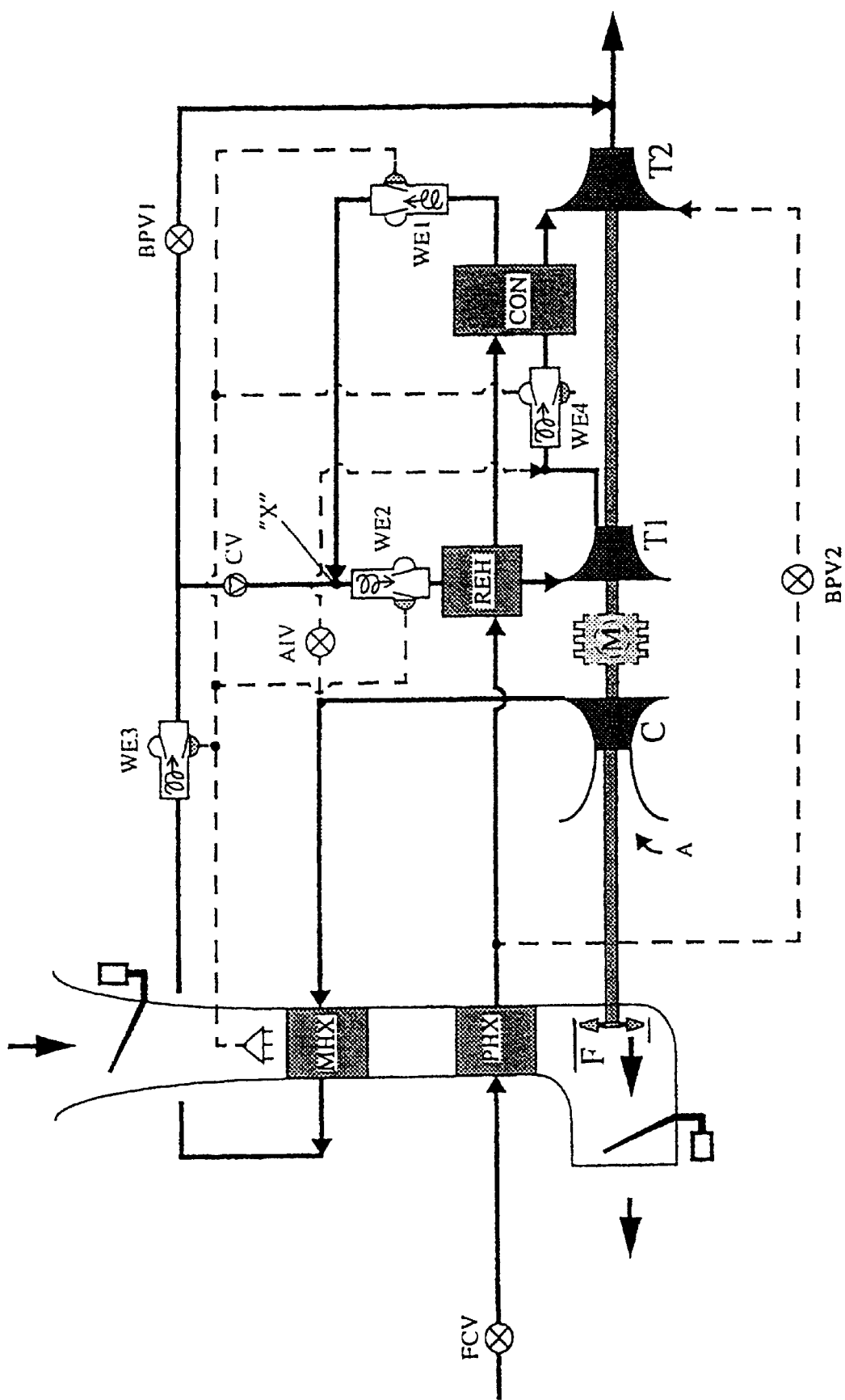
FIG. 2 a diagram of an improved form of construction of the system of FIG. 1.

A further design of the invention is shown in FIG. 2. To further improve the efficiency of the overall system, the mixed airflow's expansion in two turbines T1 and T2 in two steps. The condenser of the high pressure water extraction circuit is arranged in this case between the two turbines T1 and T2 to ensure a heat exchange between the pressure-relieved, very cool mixed airflow and the partly cooled off tapped airflow. A water extractor WE4 behind the first turbine T1 and before the condenser CON which functions as a reheater in this case causes a further increased dehumidification of the mixed air, but is not absolutely necessary.

Figure 3:
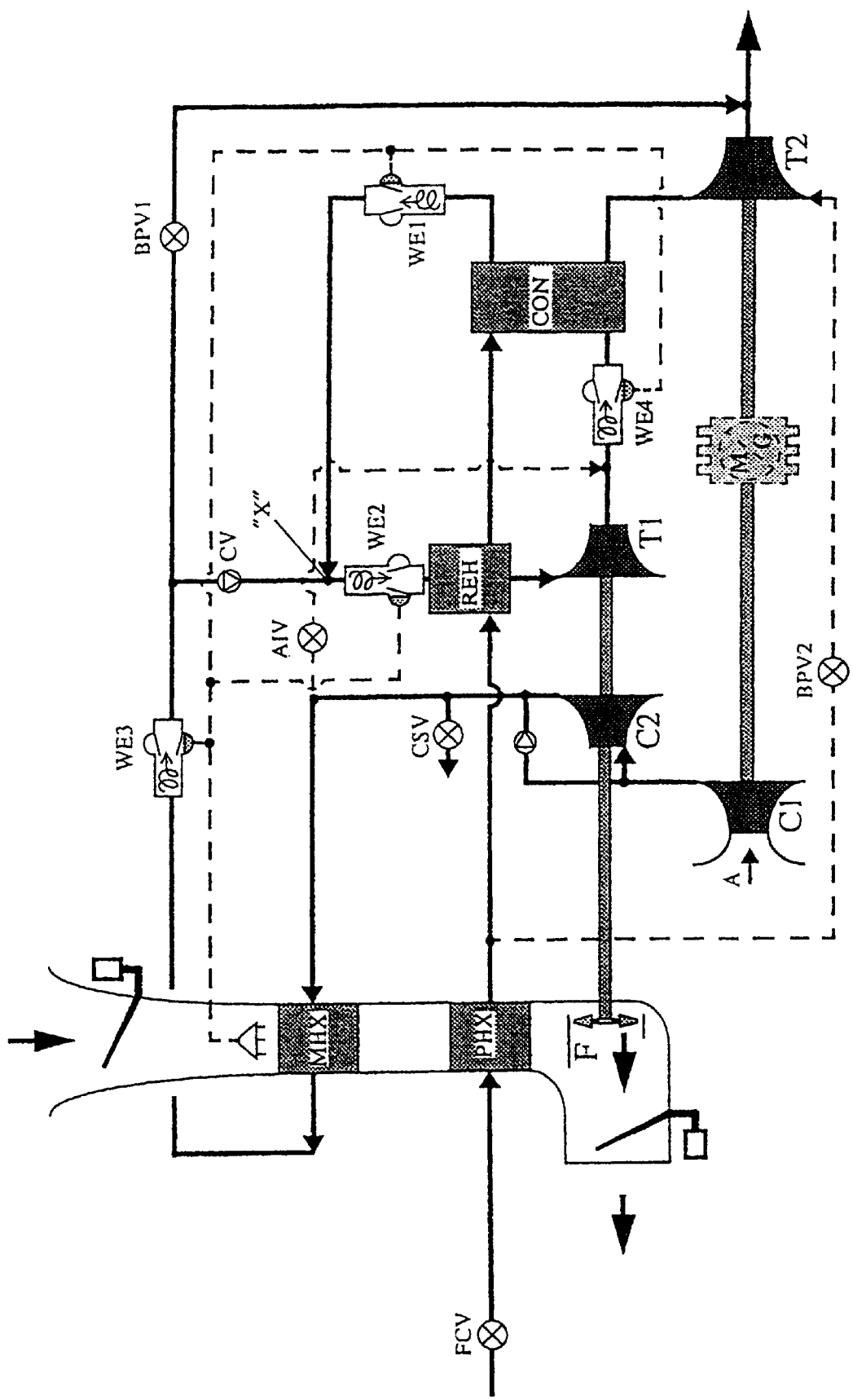
FIG. 3 a diagram of a further improved form of construction of the system from FIG. 2.

An air-conditioning system is illustrated in FIG. 3 that can be more flexibly designed than the system illustrated in FIG. 2, in such a way that an even greater efficiency of the overall system is achievable. For this, it is provided for to compress the ambient air A in two steps in two compressors C1 and C2. By mounting one compressor wheel with one turbine wheel on a shared shaft in each case, that is, providing altogether two shafts independent of each other, two machines separated from each other are created that can each be optimally designed In the illustrated case, the energy needed for the first compressor step is delivered by the second turbine stage and the energy required for the second compressor step is delivered by the first turbine stage.

The machine with the turbine T1 and the compressor C2 can be switched off in flight, especially since the fan F is not needed in flight because of the high ram pressure available anyway. The three-wheel machine (T1, C2, F) is switched off by opening the bypass valves BPV1 of the ambient air circuit and BPV2 of the tapped air circuit.

The design of the air-conditioning system with two machines separated from each other, each comprising a compressor and a turbine wheel on a shared shaft, one of which can be switched off in flight, offers further advantages because for system-related reasons, a greater pressure ratio is available in ground operation than in flight. In this way, it saves energy to provide a relatively small turbine nozzle (guide baffle cross-section) in ground operation. This small nozzle is produced by connecting in series the two turbine stages, producing an "aggregate nozzle" that is smaller than each individual nozzle. In flight, however, despite a smaller available pressure ratio, roughly the same flow volume is needed for the air-conditioning of the airplane cabin, such that in flight, a large nozzle would be necessary for roughly the same air throughput. Switching off the three-wheel machine and thus the turbine stage T1 for the entire system in flight results, due to the solely remaining turbine T2 of the second turbine stage, in a large nozzle for the entire system. In this way, efficiency can be increased in flight. This gain in efficiency is preferably used to design the primary and the main heat-exchangers as small and light as possible provided the required flow volume quantity is fulfilled precisely.

In the final analysis, with the measure of providing two machines instead of just one machine, a smaller size of the heat-exchangers and thus a lower overall weight of the air-conditioning system can be achieved.

In the form of construction of the invention illustrated in FIG. 3, the motor M mounted with the compressor C1 and the turbine T2 on a shared shaft can also function as a generator G particularly in flight, if the full fresh air quantity does not need to be made available, for example, due to a cabin with only few passengers occupying it. In this case, the surge valve CSV is opened and the bypass valve BPV1 is closed, in such a way that the ambient airflow A is blown off again uncompressed via the surge valve CSV, that is, it is not fed via the bypass valve BPV1 of the mixing chamber not shown. The compressor C1 then continues to run empty at the same time and/or consumes no power, in such a way that the energy generated in the turbine T2 due to the tapped air's expansion can be used as generator capacity instead of to produce compressed ambient air.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A process for preparing air for air-conditioning of a space, comprising the steps of:
    tapping of a first, pressurized partial airflow from a power unit or auxiliary power unit to form a tapped airflow;
    tapping and compressing of a second partial airflow from said space to form a compressed ambient airflow to a pressure in the range of 0.8 bar to 4 bar;
    combining said tapped airflow and said compressed ambient airflow to form a mixed airflow;
    expanding said mixed airflow;
    guiding the tapped airflow in a heat-exchanging manner past the expanded mixed airflow in order to cool the tapped airflow before combining with the ambient airflow; and
    conveying said mixed airflow for said air-conditioning of said space.

2. The process according to claim 1, further comprising the step of:
    guiding the tapped airflow past the mixed airflow after expanding said mixed airflow.

3. The process according to claim 1, further comprising the step of:
    guiding the tapped airflow past the mixed airflow before expanding said mixed airflow.

4. The process according to claim 1, wherein the energy required to compress the ambient air is obtained in the step of expanding said mixed airflow and is utilized regeneratively.

5. The process according to claim 1, further comprising the step of:
    feeding energy extraneous to the system to compress the ambient airflow.

6. The process according to claim 1, wherein the ratio of mass tapped airflow to mass ambient airflow is between 99.9:0.1 and 50:50.

7. The process according to claim 6, wherein the ratio of mass tapped airflow to mass ambient airflow is roughly 65:35.

8. The process according to claim 1, further comprising the step of separating water from the mixed airflow before the step of expanding said mixed airflow.

9. The process according to claim 1, further comprising the step of separating water from the tapped airflow and/or the compressed ambient airflow before the step of combining.

10. The process according to claim 1, wherein the tapped airflow is made available at an input pressure ranging from 1.5 bar in flight to 4 bar in ground operation.

11. The process according to claim 1, wherein the pressure ratios of the tapped airflow and the ambient airflow are selected in such a way that in ground operation, a pressure of roughly 3.4 bar ensues for the mixed airflow when the tapped airflow and the compressed ambient airflow are combined.

12. The process according to claim 1, wherein the tapped airflow is guided in heat-exchanging manner past a separate cooling airflow and in the process, undergo a relatively great pressure change of roughly $\Delta p=0.05$ bar to $\Delta p=0.3$ bar.

13. The process according to claim 1, wherein the compressed ambient airflow is guided in heat-exchanging manner past a separate cooling airflow and in the process, undergoes a relatively small pressure change of roughly $\Delta p=0.01$ bar to $\Delta p=0.05$ bar.

14. The process according to claim 12, wherein at first the compressed ambient airflow and then the tapped airflow are guided in heat-exchanging manner past the separate cooling airflow.

15. The process according to claim 12, wherein water separated from the tapped airflow and/or the mixed airflow and/or the compressed ambient airflow is fed into the separate cooling airflow for evaporation.

16. The process according to claim 1, wherein said mixed airflow's expansion takes place in two steps and between the two expansion steps the mixed airflow is guided in heat-exchanging manner past the tapped airflow to cool the tapped airflow.

17. The process according to claim 16, wherein after the mixed airflow's expansion, water is removed from the mixed airflow.

18. The process according to claim 1, wherein said step of compressing said ambient airflow and said step of expanding said mixed airflow each take place in two steps, in connection with which, for each said compression step energy is utilized regeneratively from only one of said two expansion steps in each case.

19. An air-conditioning system for preparing pressurized air for air-conditioning of a space, comprising:
at least one compressor installation contacting ambient air and compressing a partial airflow originating from the ambient air to form a compressed ambient airflow to a pressure in the range of 0.8 bar to 4 bar,
a mixing element in which the compressed ambient airflow is combined with a tapped airflow tapped from a power unit to form a mixed airflow,
at least one turbine installation for dropping the pressure of the mixed airflow to a lower pressure level and for cooling off the mixed airflow, and
at least one heat-exchanger receiving said tapped airflow and receiving said mixed airflow.

20. The air-conditioning system according to claim 19, wherein said at least one heat-exchanger is positioned after said at least one turbine to receive the mixed airflow after the expansion of the mixed airflow.

21. The air-conditioning system according to claim 19, wherein said at least one heat-exchanger is positioned before said at least one turbine to receive the mixed airflow before the expansion of the mixed airflow.

22. The air-conditioning system according to claim 19, wherein said at least one turbine installation has at least one turbine wheel and the compressor installation has at least one compressor wheel, with both wheels on a shared shaft.

23. The air-conditioning system according to claim 19, wherein a motor is provided for supplying system-extraneous energy for the compressor installation.

24. The air-conditioning system according to claim 19, wherein the compressor installation and said at least one turbine installation have a ratio of conveyed mass tapped airflow to conveyed mass ambient airflow which is in the 99.9:0.1 to 50:50 range.

25. The air-conditioning system according to claim 24, wherein the ratio of mass tapped airflow to mass ambient airflow is roughly 65:35.

26. The air-conditioning system according to claim 19, wherein a water separator is arranged between the mixing element and said at least one turbine installation.

27. The air-conditioning system according to claim 19, wherein in a flow direction, before the mixing element, a water separator is provided for separating water from the compressed ambient airflow and/or the tapped airflow.

28. The air-conditioning system according to claim 19, wherein a pressure of roughly 3.4 bar ensues for the mixed airflow at the mixing element.

29. The air-conditioning system according to claim 19, wherein the tapped airflow and the ambient airflow are guided by a first and a second heat-exchanger past a cooling airflow, in connection with which the first heat-exchanger serves to cool the compressed ambient airflow and is arranged in the flow direction of the cooling airflow before the second heat-exchanger to cool the tapped airflow.

30. The air-conditioning system according to claim 29, wherein a water injection device is provided with which water separated from the tapped airflow and/or from the mixed airflow and/or from the compressed ambient airflow is guided, before the first heat-exchanger, into the cooling airflow for evaporation there.

31. The air-conditioning system according to claim 20, wherein said at least one turbine installation comprises two turbine stages and the at least one heat-exchanger is arranged between the two turbine stages.

32. The air-conditioning system according to claim 31, wherein a water separator is arranged between the two turbine stages.

33. The air-conditioning system according to claim 19, wherein said at least one compressor installation includes two compressor wheels on separate shafts and each said compressor wheel is mounted, with only one turbine wheel in each case, on a shared shaft.

34. The air-conditioning system according to claim 19, wherein one of the shafts is additionally equipped with a motor that can also act as a generator.

35. The air-conditioning system according to claim 34, wherein in the flow direction of the ambient airflow and behind the compressor installation, a surge valve is provided in order to blow off largely uncompressed ambient air sucked in.

36. The air-conditioning system according to claim 19, wherein a bypass valve is provided in order, during flight, to mix the compressed ambient airflow into the tapped airflow only after its pressure has dropped.

37. The air-conditioning system according to claim 19, wherein a bypass valve is provided in order, during flight, to direct the tapped airflow past the mixing element directly to the expansion installation.

* * * * *